(12) United States Patent
Hunsaker et al.

(10) Patent No.: US 7,945,719 B2
(45) Date of Patent: May 17, 2011

(54) CONTROLLER LINK FOR MANAGEABILITY ENGINE

(75) Inventors: Mikal Hunsaker, El Dorado Hills, CA (US); Karthi Vadivelu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 259 days.

(21) Appl. No.: 11/524,849

(22) Filed: Sep. 20, 2006

(65) Prior Publication Data

US 2008/0072098 A1   Mar. 20, 2008

(51) Int. Cl.
*G06F 12/00* (2006.01)
*G06F 3/00* (2006.01)
*G06F 5/00* (2006.01)
*G06F 15/16* (2006.01)
*H04Q 11/00* (2006.01)
*H04L 12/56* (2006.01)

(52) U.S. Cl. ........ 710/112; 370/375; 370/400; 370/410; 709/233; 710/29; 710/52

(58) Field of Classification Search ............. 710/29, 710/52; 370/375, 400, 410; 709/233
See application file for complete search history.

(56) References Cited

U.S. PATENT DOCUMENTS

| | | | | |
|---|---|---|---|---|
| 4,739,324 | A * | 4/1988 | Miesterfeld et al. | 710/240 |
| 5,825,748 | A * | 10/1998 | Barkey et al. | 370/236 |
| 5,923,858 | A | 7/1999 | Kanekal | |
| 6,006,340 | A | 12/1999 | O'Connel | |
| 6,088,046 | A * | 7/2000 | Larson et al. | 345/538 |
| 6,463,484 | B1 * | 10/2002 | Moss | 710/36 |
| 6,658,519 | B1 * | 12/2003 | Broberg et al. | 710/311 |
| 6,745,369 | B1 * | 6/2004 | May et al. | 716/1 |
| 6,747,949 | B1 * | 6/2004 | Futral | 370/231 |
| 6,778,497 | B1 * | 8/2004 | Choi | 370/231 |
| 6,877,060 | B2 * | 4/2005 | Hunsaker | 710/310 |
| 6,950,438 | B1 | 9/2005 | Owen et al. | |
| 7,181,544 | B2 * | 2/2007 | Vangal et al. | 709/250 |
| 7,181,556 | B2 * | 2/2007 | Gwilt | 710/110 |

(Continued)

FOREIGN PATENT DOCUMENTS

TW   468112   12/2001

OTHER PUBLICATIONS

Taiwan IPO Search Report for Taiwan Invention Patent Application No. 096135166, mailed by Taiwan Patent Office Dec. 31, 2010.

*Primary Examiner* — Mark Rinehart
*Assistant Examiner* — Christopher A Daley
(74) *Attorney, Agent, or Firm* — Blakely, Sokoloff, Taylor & Zafman LLP

(57) ABSTRACT

An embodiment of the present invention is an efficient interconnecting bus. A first clock source generates a first clock signal at a first frequency on a link bus line synchronized with first data to be transmitted to a device. The device has a second clock source to generate a second clock signal at a second frequency synchronized with second data when the device transmits the second data. The first and second data each forms a packet being one of a posted, completion, and non-posted packets. The first and second frequencies are independent of each other and bounded within first and second frequency ranges, respectively. A queue structure stores packets used in a credit-based flow control policy.

29 Claims, 5 Drawing Sheets

U.S. PATENT DOCUMENTS

| | | |
|---|---|---|
| 7,221,763 B2* | 5/2007 | Verbauwhede ............... 380/277 |
| 7,474,662 B2* | 1/2009 | Basso et al. .............. 370/395.41 |
| 7,536,473 B2* | 5/2009 | Ajanovic et al. ............. 709/234 |
| 7,587,587 B2* | 9/2009 | Buer et al. .................... 713/153 |
| 7,644,221 B1* | 1/2010 | Chan et al. ................... 710/315 |
| 7,685,436 B2* | 3/2010 | Davis et al. .................. 713/192 |
| 2003/0046472 A1* | 3/2003 | Morrow ....................... 710/305 |
| 2003/0110339 A1* | 6/2003 | Calvignac et al. ............ 710/305 |
| 2003/0126296 A1* | 7/2003 | Aviles .......................... 709/250 |
| 2004/0019729 A1* | 1/2004 | Kelley et al. ................. 710/306 |
| 2004/0024943 A1* | 2/2004 | Lupien et al. ................ 710/305 |
| 2004/0088450 A1* | 5/2004 | Dodd et al. .................... 710/52 |
| 2004/0103224 A1* | 5/2004 | Duresky et al. ................. 710/52 |
| 2004/0120343 A1* | 6/2004 | Kawashima .................. 370/463 |
| 2005/0086361 A1* | 4/2005 | Rashid et al. ................. 709/233 |
| 2005/0278511 A1* | 12/2005 | Myers .......................... 712/225 |
| 2006/0050639 A1* | 3/2006 | Stuart et al. .................. 370/235 |
| 2006/0174040 A1* | 8/2006 | Check et al. .................... 710/29 |
| 2006/0206655 A1* | 9/2006 | Chappell et al. ............. 710/315 |
| 2007/0097864 A1* | 5/2007 | Bernstein ..................... 370/232 |
| 2007/0174344 A1* | 7/2007 | Goh et al. ..................... 707/200 |
| 2007/0209072 A1* | 9/2007 | Chen .............................. 726/16 |
| 2007/0233982 A1* | 10/2007 | Chen et al. ................... 711/163 |

* cited by examiner

| ROW PASS COLUMN? | POSTED REQUEST | NON-POSTED REQUEST | COMPLETION |
|---|---|---|---|
| POSTED REQUEST | NO | YES | NO |
| NON-POSTED REQUEST | NO | NO | NO |
| COMPLETION | NO | YES | NO |

FIG. 4

CONTROLLER LINK FOR MANAGEABILITY ENGINE

BACKGROUND

1. Field of the Invention

Embodiments of the invention relate to the field of microprocessors, and more specifically, to communication bus.

2. Description of Related Art

Chipsets have become more and more important in a typical microprocessor system. A chipset may provide many functionalities to support tasks such as device interface, memory control, input/output (I/O) control, power management, security management, network interface, etc. As more and more chipsets are integrated into a microprocessor system, interconnecting devices and chipsets becomes a challenge.

Existing techniques to provide interconnect buses have a number of drawbacks. High speed interfaces such as the Peripheral Component Interconnect (PCI) Express as provided in the PCI Base Specification 1.1 published by PCI Special Interest Group (SIG) in 2004, requires high power consumption, even when not actively transmitting or receiving. These bus interfaces typically have high pin count, requiring large space for connectors. They typically use a common clock source, leading to difficulty to obtain clock signals during off-power states. In addition, they may have complex communication protocols, resulting in hardware complexity.

BRIEF DESCRIPTION OF THE DRAWINGS

Embodiments of invention may best be understood by referring to the following description and accompanying drawings that are used to illustrate embodiments of the invention. In the drawings:

FIG. 4 is a diagram illustrating a transaction ordering logic according to one embodiment of the invention.

DESCRIPTION

Figure 1:
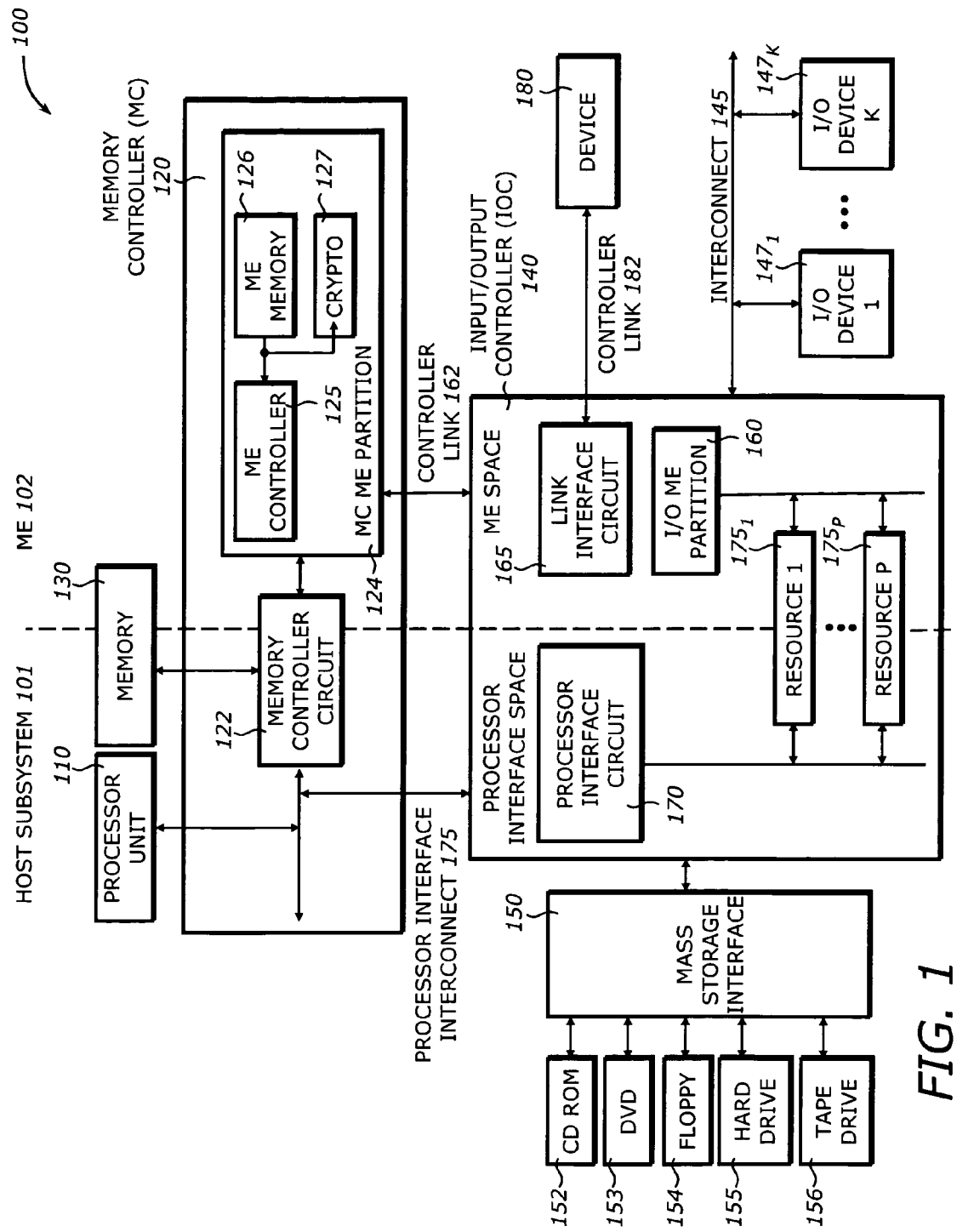
FIG. 1 is a diagram illustrating a system in which one embodiment of the invention can be practiced.

An embodiment of the present invention is an efficient interconnecting bus. A first clock source generates a first clock signal at a first frequency on a link bus line synchronized with first data to be transmitted to a device. The device has a second clock source to generate a second clock signal at a second frequency synchronized with second data when the device transmits the second data. The first and second data each forms a packet being one of a posted, completion, and non-posted packets. The first and second frequencies are independent of each other and bounded within first and second frequency ranges, respectively. A queue structure stores packets used in a credit-based flow control policy.

In the following description, numerous specific details are set forth. However, it is understood that embodiments of the invention may be practiced without these specific details. In other instances, well-known circuits, structures, and techniques have not been shown to avoid obscuring the understanding of this description.

One embodiment of the invention may be described as a process, which is usually depicted as a flowchart, a flow diagram, a structure diagram, or a block diagram. Although a flowchart may describe the operations as a sequential process, many of the operations can be performed in parallel or concurrently. A loop or iterations in a flowchart may be described by a single iteration. It is understood that a loop index or loop indices or counter or counters are maintained to update the associated counters or pointers. In addition, the order of the operations may be re-arranged. A process terminates when its operations are completed. A process may correspond to a method, a program, a procedure, etc. A block diagram may contain blocks or modules that describe an element, an item, a component, a device, a unit, a subunit, a structure, a method, a process, a function, an operation, a functionality, or a task, etc. A functionality or an operation may be performed automatically or manually.

One embodiment of the invention is a technique to provide an interconnecting bus with many features that are useful for communication between peripheral devices. These features include low power, low pin count, independent clocking, and medium bandwidth. The bus may operate as a bi-directional half duplex communication link with two signal lines: clock and data that operate in a source synchronous manner. In addition, there may be a platform reset signal. When the bus is connected to two devices, each device may have different clock sources with wide variances. The bus may also operate as a full-duplex mode. Another embodiment of the invention simplifies the transaction ordering rules to provide simple design and less expense while still maintain full compliance with PCI standard as provided in the "Conventional PCI 3.0" specification published by the PCI SIG in 2004 and PCI Express standards. This may be achieved by allowing the posted transactions and completion transactions to share the same credit. Another embodiment of the invention is to detect an idle state without using a special message between the two devices.

FIG. 1 is a diagram illustrating a system 100 in which one embodiment of the invention can be practiced. The system 100 may be partitioned into a host subsystem 101 and a manageability engine (ME) 102. The system 100 includes a processor unit 110, a memory controller (MC) 120, a memory 130, an input/output controller (IOC) 140, an interconnect 145, input/output (I/O) devices $147_1$ to $147_K$, and a mass storage interface 150, and a device 180.

The host subsystem 101 includes components that normally operate in a normal environment. The ME 102 is a complete subsystem embedded into the system 100 integrated to provide isolated system management and firmware-based system features for the platform. The ME 102 normally may not access the resources of the host subsystem 101 and the host subsystem 101 may not access the ME resources. However, the ME 102 may share a few resources with the host subsystem 101 in a secure manner. These shared resources prevent unsecured access between the ME 102 and the host partitions to effectively isolate the ME 102 from the host subsystem 101.

The processor unit 110 represents a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The MC 120 is a chipset to provide control and configuration of memory and input/output devices such as the memory 130 and the IOC 140. The MC 120 may be integrated into a chipset that integrates multiple functionalities such as graphics, media, isolated execution mode, host-to-peripheral bus interface, memory control, power management, etc. The MC 120 or the memory controller functionality in the MC 120 may be integrated in the processor unit 110. In some embodiments, the memory controller, either internal or external to the processor unit 110, may work for all cores or processors in the processor unit 110. In other embodiments, it may include different portions that may work separately for different cores or processors in the processor unit 110. The MC 120 includes a memory controller circuit 122 and a MC ME partition 124. The memory controller circuit 122 provides memory control functionalities and other control functions. The MC ME partition 124 is a part of the ME 102. It may share the memory control circuit 122 with the host subsystem 101 in a secure manner.

The MC ME 124 includes at least a ME controller 125, an ME memory 126, and a crypto module 127. The MC ME 124 may include other components. The ME controller 125 is a processor or a controller that may execute program to perform the management functions. The ME memory 126 may include random access memory (RAM), flash memory, or read only memory (ROM) to store program and data. The crypto module 127 is used for encrypting and decrypting and authenticating messages. It may support Advanced Encryption Standard (AES), AES-Cipher Block Chaining (CBC), Rivest Cipher 4 (RC4) algorithms for encryption and decryption. It may support secure hash algorithm-1 (SHA-1), message digest algorithm 5 (MD5), and hash message authentication code (HMAC) algorithms for authentication.

The memory 130 stores system code and data. The main memory 130 is typically implemented with dynamic random access memory (DRAM), static random access memory (SRAM), or any other types of memories including those that do not need to be refreshed. The memory 130 may include multiple channels of memory devices such as DRAMs. The DRAMs may be Synchronous DRAM (SDRAM), Single Data Rate (SDR) SDRAM, Extended Data Out (EDO) DRAM, Double Data Rate (DDR) SDRAM, Double Data Rate Two (DDR2) SDRAM, Rambus DRAM (RDRAM R), Extreme Data Rate (XDR), or XDR II. RDRAM and XDR are registered trademarks of Rambus. The DDR doubles transfer rates by transferring data on both the rising and falling edges of the clock and may be packaged in a Dual In Line Memory Module (DIMM). This effectively doubles the transfer rate without increasing the frequency of the front side bus (FSB). The DDR2 increases the data rates using various techniques such as on-die termination to eliminate excess signal noise on the chip, pre-fetch buffers, and off-chip drivers. The off-chip drivers may use calibration techniques to calibrate the differential data strobes against each other. Through the calibration, the ramping voltages are optimized for the buffer impedances to reduce over- and under-shooting at the rising and falling edges. The XDR or XDR II uses Differential Rambus Signaling Levels (DRSL) for scalable high speed point-to-point bidirectional data signals and Rambus Signaling Level (RSL) for source synchronous bussed address and command signals to multiple deices. The memory devices used in the memory 130 may operate at any suitable clock frequency, such as 100 MHz, 133 MHz, 166 MHz, 266 MHz, 333 MHz, 400 Mhz, 1 GHz, or scalable to 8 GHz. They may be packaged in any packaging technologies including Ball Grid Array (BGA), DIMM, sticks or modules. The memory 130 may include other types of memory devices that are populated on the platform and have an address range within the processor address space.

The IOC 140 has a number of functionalities that are designed to support I/O functions. The IOC 140 may also be integrated into a chipset together or separate from the MC 120 to perform I/O functions. The IOC 140 may include a number of interface and I/O functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, wireless interconnect, direct media interface (DMI), etc. The IOC 140 includes an I/O ME partition 160, a link interface circuit 165, a processor interface space circuit 170, and P resources $175_1$ to $175_P$.

The I/O ME partition 160 is a part of the ME 102. It manages I/O resources shared with the processor subsystem 101 in a secure manner. The I/O ME partition 160 operates in a peripheral interconnect space that is secured. The peripheral interconnect space is associated with the Peripheral Component Interconnect (PCI) link. The I/O ME partition 160 is interfaced to the MC ME partition 124 via a controller link 162. The controller link 162 is a secure link in the ME 102. It typically consumes very low power. It has low pin count, typically includes two signals, a bi-directional clock signal and a data signal, and a reset signal. It has independent clocking. The bandwidth of the controller link 162 is medium, ranging from 8 Megabits per second (Mbps) to 66 Mbps.

The processor interface circuit 170 includes circuits that operate in the processor interface space. The processor interface space is accessible to the processor unit 110 via a processor interface interconnect or link 175. In one embodiment, the processor interface interconnect 175 is a direct media interface (DMI) interconnect or link.

The link interface circuit 165 provides interface for communication with the device 180 via a controller link 182. The controller link 182 is similar to the controller link 162. The P resources $175_1$ to $175_P$ may include any resources that are shared by both the I/O ME partition 160 and the processor interface space circuit 170. Examples of the P resources $175_1$ to $175_P$ may include flash memories and media access controller (MAC) for Gigabit Ethernet. The I/O ME partition 160 may include other components that are not shown such as timers, thermal control interface, power management circuits, general purpose I/O devices, etc.

The interconnect 145 provides interface to peripheral devices. The interconnect 145 may be point-to-point or connected to multiple devices. For clarity, not all interconnects are shown. It is contemplated that the interconnect 145 may include any interconnect or bus such as Peripheral Component Interconnect (PCI), PCI Express, Universal Serial Bus (USB), Small Computer System Interface (SCSI), serial SCSI, and Direct Media Interface (DMI), etc.

The mass storage interface 150 interfaces to mass storage devices to store archive information such as code, programs, files, data, and applications. The mass storage interface may include SCSI, serial SCSI, Advanced Technology Attachment (ATA) (parallel and/or serial), Integrated Drive Electronics (IDE), enhanced IDE, ATA Packet Interface (ATAPI), etc. The mass storage device may include compact disk (CD) read-only memory (ROM) 152, digital video/versatile disc (DVD) 153, floppy drive 154, and hard drive 155, tape drive 156, and any other magnetic or optic storage devices. The mass storage device provides a mechanism to read machine-accessible media.

The I/O devices $147_1$ to $147_K$ may include any I/O devices to perform I/O functions. Examples of I/O devices $147_1$ to $147_K$ include controller for input devices (e.g., keyboard, mouse, trackball, pointing device), media card (e.g., audio, video, graphic), network card, and any other peripheral controllers.

The device 180 may be any device that resides in the ME partition. It has interface circuit to allow it to communicate with a device such as the IOC 140 via the controller link 182.

Figure 2:
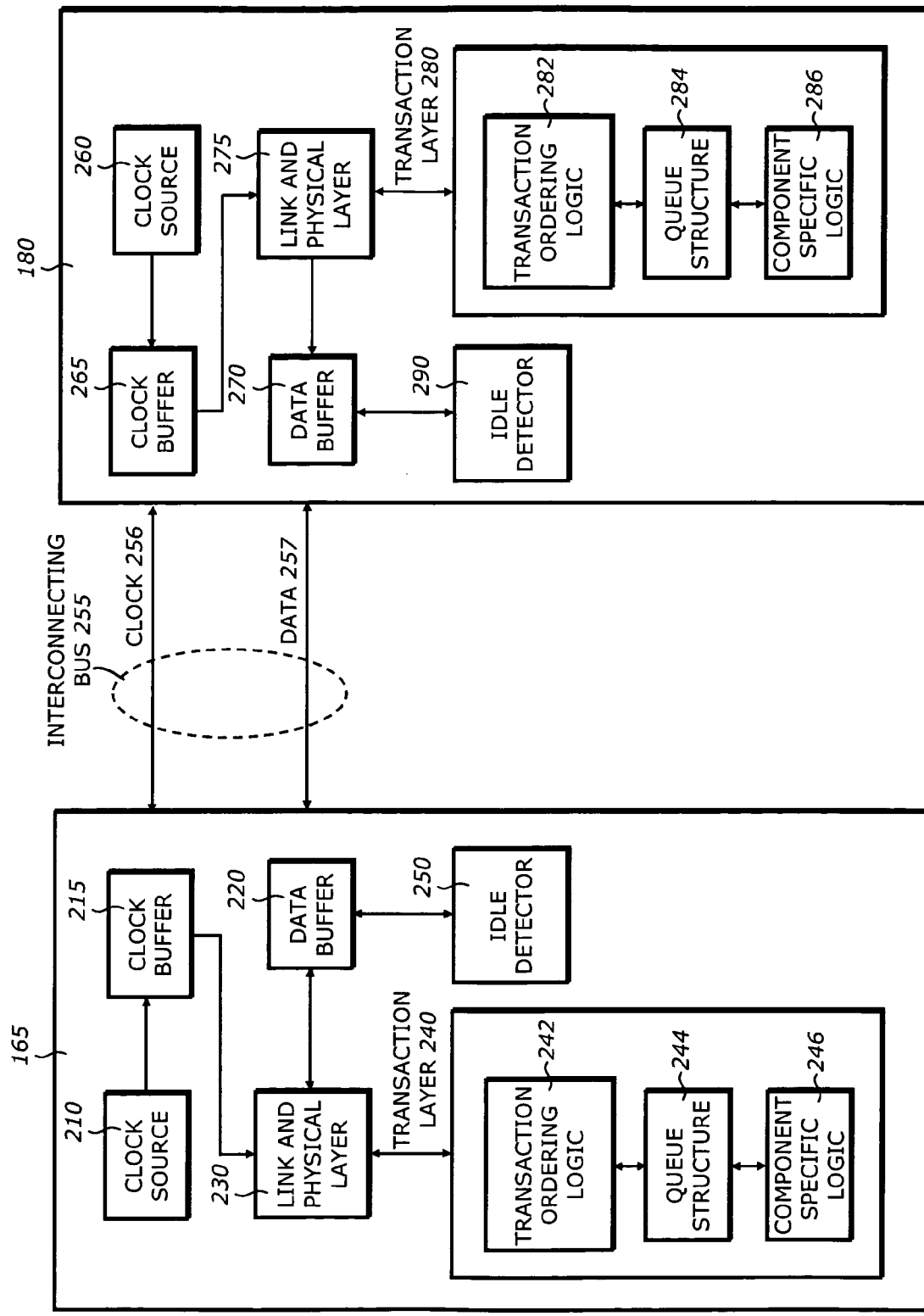
FIG. 2 is a diagram illustrating an interconnecting bus between two devices according to one embodiment of the invention.

FIG. 2 is a diagram illustrating an interconnecting bus 255 between two devices according to one embodiment of the invention. The interconnecting bus 255 connects the link interface circuit 165 to the device 180. It is an instance of the controller link 182 shown in FIG. 1. The link interface circuit 165 includes a clock source 210, a clock buffer 215, a data buffer 220, a link and physical layer 230, a transaction layer 240, and an idle detector 250. The device 180 includes a clock source 260, a clock buffer 265, a data buffer 270, a link and physical layer 275, a transaction layer 280, and an idle detector 290.

The interconnecting bus 255 includes a clock line 256 and a data line 257. In one embodiment, the interconnecting bus 255 operates in a half duplex mode where the bus transmits the data in one direction at a time. In another embodiment, there may be two buses, each with the same structure as the interconnecting bus 255, operating in a full duplex mode. In another embodiment, the clock signal may be embedded with the data to be transmitted in a single line.

The clock source 210 may be any suitable clock source such as crystal oscillator or ring oscillator. It generates a first clock signal at a first frequency on a clock line 256 through the clock buffer 215. The clock signal is synchronized with the data transmitted to the device 180 via the data buffer 220.

Similarly, the clock source 260 may be any suitable clock source such as crystal oscillator or ring oscillator. It generates a second clock signal at a second frequency on the clock line 256 through the clock buffer 265. The second clock signal is synchronized with the data transmitted to the interface 165 when the device 180 transmits data.

The clock sources 210 and 260 may be different and independent of each other. The first and second frequencies are also independent of each other and are bounded within first and second frequency ranges, respectively. The first frequency range is from approximately 8 MHz to 66 MHz and the second frequency range is from approximately 32 MHz to 266 MHz. By having different and independent clock sources between the devices with wide variances on the frequency ranges, there is no need to employ accurate techniques such as phase-locked loop which may be expensive and consume large power. This may be achieved by monitoring the consumption and production of the packets between the two devices under a credit-based flow control policy. When the two devices 165 and 180 communicate with each other, they operate within the same frequency range. This may be configured by software.

The data or message transmitted from the link interface circuit 165 or the device 180 forms a packet. The packet may be one of a posted packet, a completion packet, and non-posted packet. The posted, completion, and non-posted packets may be similar to those defined in PCI Express transactions. For example, messages and some write transactions may be posted, meaning the write request (including data) is sent, and the transactions is over from the requestor's perspective as soon as the request is sent out of the egress port.

The link and physical layer 230 performs link or interconnecting tasks such as de-serialization, serialization, decoding, error correction check and generation, link arbitration, etc.

The transaction layer 240 performs operations at the transaction level. It includes a transaction ordering logic 242, a queue structure 244, and a component specific logic 246. The transaction ordering logic 242 provides logic to enforce simplified transaction ordering rules. The queue structure 244 stores packets to be used in a flow control policy. The flow control policy may be a credit-based control policy which is similar to that used in the PCI Express protocol. The component specific logic 246 includes circuitry that performs the specific functions of the associated device.

The idle detector 250 detects an idle state on the interconnecting bus 255 without requiring special messaging between devices connected to the interconnecting bus 255 to communicate the fact that they are idle. The idle state is a state where neither device on the link or the bus 255 has anything to transmit and both devices are ready to take the bus to a lower power state. The idle detector 250 detects the idle state when the interconnecting bus 255 is used in a half duplex mode. It includes logic to implement a procedure to detect the idle state. It includes a receive flag which is set when whenever the current device receives any transaction from the other device.

The clock source 260, the clock buffer 265, the data buffer 270, the link and physical layer 275, the transaction layer 280, and the idle detector 290 may be similar to the corresponding elements in the interface 165. The two devices may not contain the same communication interface elements. The transaction layer 280 may include a transaction ordering logic 282, a queue structure 284, and a component specific logic 286, which are similar to the respective components in the transaction layer 240.

Figure 3:
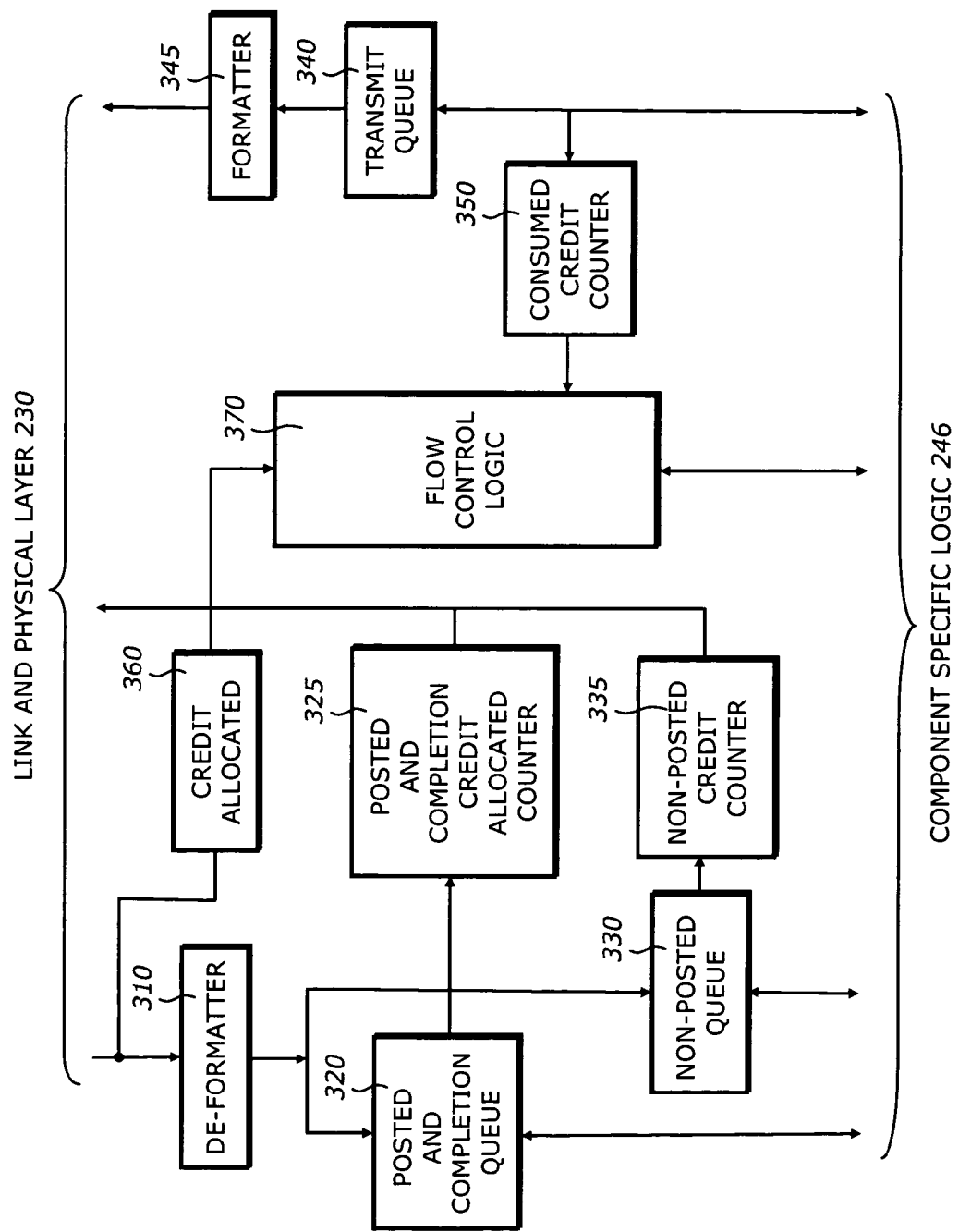
FIG. 3 is a diagram illustrating a queue structure according to one embodiment of the invention.

FIG. 3 is a diagram illustrating the queue structure 244 according to one embodiment of the invention. The queue structure 244 may be coupled to the clock source 210 via the link and physical layer 230 and the clock buffer 215. The queue structure 244 includes a de-formatter 310, a posted and completion queue 320, a posted and completion credit allocated counter 325, a non-posted queue 330, a non-posted credit counter 335, a transmit queue 340, a formatter 345, a consumed credit counter 350, a credit allocated 360, and a flow control logic 370.

The de-formatter 310 de-formats the packets received from the link and physical layer 230 and classifies into two classes. The first class includes posted and completion packets. The second class includes non-posted packets. The posted and completion queue 320 stores packets in the first class. The non-posted queue 330 stores packets in the second class. The posted and completion credit allocated counter 325 accumulates a first receive credit representing number of the receive posted and completion packets in the posted and completion queue 320. The non-posted credit counter 335 accumulates a second receive credit representing number of the receive non-posted packets in the non-posted queue 330. The first and second receive credits form received credits to be transmitted to the device 180. The credit allocated register 360 stores an updated limit of the received credits of the device 180.

The transmit queue 340 stores transmit packets for transmission. The formatter 345 formats the packets read from the transmit queue 340 and sends the formatted packets to the link and physical layer 230. The consumed credit counter 350 accumulates transmission credits representing number of the transmit packets in the transmit queue 340.

The flow control logic 370 performs flow control logic using the credit limit 360 and the consumed credit counter 350. The result is then forwarded to the component specific logic 246. In general, the flow control logic follows the same flow control logic use in the PCI Express.

FIG. 4 is a diagram illustrating a transaction ordering table 400 according to one embodiment of the invention. The transaction ordering table 400 includes a posted request row 410, a non-posted request row 420, a completion row 430, a posted request column 440, a non-posted request 450, and a completion column 460. The transaction ordering table 400 provides simplified rules for transaction ordering. In a transaction ordering, a packet or transaction may be blocked or passed. A packet/transaction is blocked when there are not enough credits to transmit it. A packet/transaction is passed when it may be forwarded across a link ahead of another packet/transaction that was received ahead of it. In addition, a packet/transaction A is said to pass a packet/transaction B when A and B are pending packet/transactions and A is asserted as the next packet/transaction. The rule allows or prohibits a transaction on the row to pass another transaction on the column.

A NO in the table indicates that the corresponding row transaction cannot pass the corresponding column transaction. For example, row 410 and column 440 intersects at a NO entry. This NO entry indicates that a posted request is not allowed to pass another posted request. As another example, row 430 and column 450 intersects at a YES entry. Therefore, a completion transaction is allowed to pass the non-posted request.

Since the posted packets and the completion packets share the same queue, the transaction ordering rules for these types of packets are the same. The transaction ordering rules only allow a posted request or a completion transaction to pass a non-posted request. The rules prohibit a posted request or a completion transaction to pass another posted request or completion transaction. The rules also prohibit a non-posted request to pass another posted request, another non-posted request, or a completion transaction.

Figure 5:
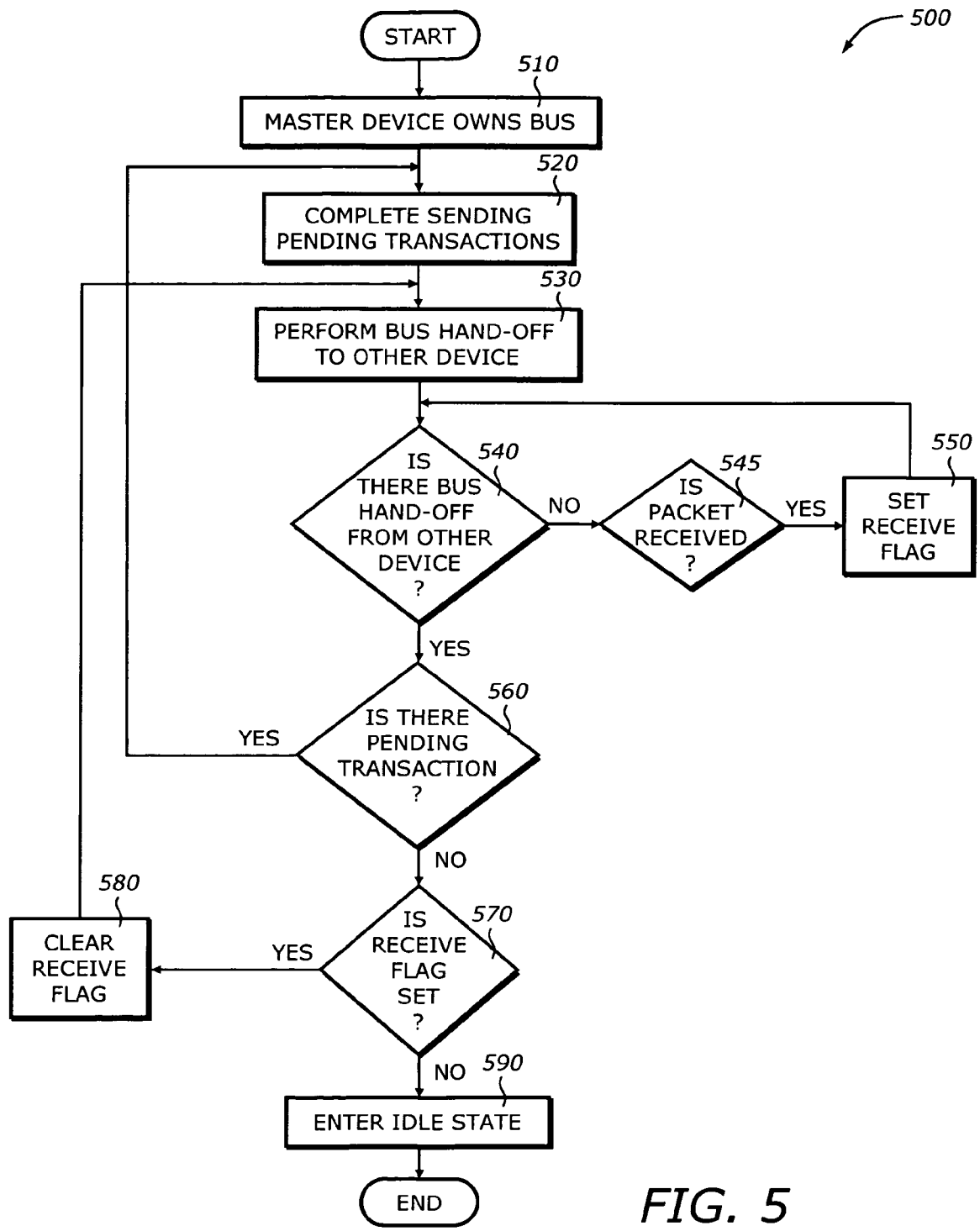
FIG. 5 is a flowchart illustrating a process to detect an idle state according to one embodiment of the invention.

FIG. 5 is a flowchart illustrating a process 500 to detect an idle state according to one embodiment of the invention.

Upon START, the process 500 owns the bus as a master (Block 510). A master is a device that currently owns the bus and drives the clock signal, or transmits the data. Next, the process 500 completes sending pending transactions (Block 520). Then, the process 500 performs a bus hand-off to another device (Block 530). A bus hand-off is a transfer of bus ownership to allow the other device to transmit data, if necessary.

Next, the process 500 determines if there is a bus hand-off from the other device back to the current device (Block 540). If not, the process 500 determines if a packet is received (Block 545). If not, the process 500 returns to Block 540. Otherwise, the process 500 sets a receive flag (Block 550) and returns to Block 540. If there is a hand-off from the other device, the process 500 determines if there is a pending transaction (Block 560). If so, the process 500 returns to Block 520 to complete sending pending transactions. Otherwise, the process 500 determines if the receive flag is set (Block 570).

If the receive flag is set, the process 500 clears the receive flag (Block 580) and returns to Block 530 to perform a bus hand-off to the other device. Otherwise, the process 500 enters the idle state (Block 590) and is then terminated.

Elements of embodiments of the invention may be implemented by hardware, firmware, software or any combination thereof. The term hardware generally refers to an element having a physical structure such as electronic, electromagnetic, optical, electro-optical, mechanical, electro-mechanical parts, components, or devices, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), an erasable programmable ROM (EPROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described above. The machine accessible medium may also include program code embedded therein. The program code may include machine readable code to perform the operations described above. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
a first clock source in a manageability engine (ME) space having an input/output (I/O) ME partition to generate a first clock signal at a first frequency on a link bus line synchronized with first data to be transmitted to a device, the device having a second clock source to generate a second clock signal at a second frequency synchronized with second data when the device transmits the second data, the first and second data each forming a packet being one of a posted packet, a completion packet, and a non-posted packet, the first and second frequencies being independent of each other and bounded within first and second frequency ranges, respectively, the I/O ME partition managing input/output resources which are shared between a processor interface space of a processor and the ME space in a secure manner, the I/O ME partition being a part of an ME having a memory controller (MC) ME partition and the I/O ME partition; and
a queue structure coupled to the first clock source to store packets used in a credit-based flow control policy, the queue structure having a first queue to store receive posted and completion packets and a second queue to store receive non-posted packets.

2. The apparatus of claim 1 wherein the first clock signal is separated from the first data.

3. The apparatus of claim 1 wherein the first clock signal and the first data are embedded in the link bus line.

4. The apparatus of claim 1 wherein the first frequency range is from approximately 8 MHz to 66 MHz and the second frequency range is from approximately 32 MHz to 266 MHz.

5. The apparatus of claim 1 wherein the queue structure further comprises:
a first received credit counter coupled to the first queue to accumulate a first receive credit representing number of the receive posted and completion packets in the first queue;
a second received credit counter coupled to the second queue to accumulate a second receive credit representing number of the receive non-posted packets in the second queue, the first and second credits forming received credits to be transmitted to the device; and
a credit limit to update limit of the received credits of the device.

6. The apparatus of claim 5 wherein the queue structure further comprises:
a transmit queue to store transmit packets for transmission; and
a consumed credit counter coupled to the transmit queue to accumulate transmission credits representing number of the transmit packets in the transmit queue.

7. The apparatus of claim 6 wherein the credit-based flow control policy is based on the transmission credits and the credit limit.

8. The apparatus of claim 5 further comprising:
a transaction ordering logic coupled to the queue structure to enforce simplified transaction ordering rules that allow posted and completion transaction to share same credit.

9. The apparatus of claim 8 wherein the transaction ordering logic allows a posted request or a completion request to pass a non-posted request, prohibits a posted request or a completion request to pass another posted or completion request, and prohibits a non-posted request to pass another non-posted request.

10. The apparatus of claim 1 further comprising:
an idle detector to detect an idle state on the link bus line without using a special message to or from the device.

11. The apparatus of claim 10 wherein the idle detector comprises:
a receive flag to be set when a packet is received and a bus hand-off to other device occurs, the receive flag being cleared when there is no pending transaction to be sent and there is a bus hand-off from other device.

12. The apparatus of claim 11 wherein the idle state is detected when there is no pending transaction to be sent after a bus hand-off from the other device and the receive flag is cleared.

13. A method comprising:
generating a first clock signal in a manageability engine (ME) space having an input/output (I/O) ME partition at a first frequency on a link bus line synchronized with first data to be transmitted to a device, the device having a second clock source to generate a second clock signal at a second frequency synchronized with second data when the device transmits the second data; the first and second data each forming a packet being one of a posted, completion, and non-posted packets, the first and second frequencies being independent of each other and bounded within first and second frequency ranges, respectively, the I/O ME partition managing input/output resources which are shared between a processor interface space of a processor and the ME space in a secure manner, the I/O ME partition being a part of an ME having a memory controller (MC) ME partition and the I/O ME partition; and
storing packets in a queue structure, the packets being used in a credit-based flow control policy, the queue structure having a first queue to store receive posted and completion packets and a second queue to store receive non-posted packets.

14. The method of claim 13 wherein generating the first clock signal comprises separating the first clock signal from the first data.

15. The method of claim 13 wherein generating the first clock signal comprises embedding the first clock signal and the first data in the link bus line.

16. The method of claim 13 wherein the first frequency range is from approximately 8 MHz to 66 MHz and the second frequency range is from approximately 32 MHz to 266 MHz.

17. The method of claim 13 wherein storing packets in the queue structure comprises:
accumulating a first receive credit representing number of the receive posted and completion packets in the first queue;
accumulating a second receive credit representing number of the receive non-posted packets in the second queue, the first and second credits forming received credits to be transmitted to the device; and
updating limit of the received credits of the device in a credit limit.

18. The method of claim 17 wherein storing packets in the queue structure further comprises:
storing transmit packets for transmission in a transmit queue; and
accumulating transmission credits representing number of the transmit packets in the transmit queue.

19. The method of claim 18 wherein the credit-based flow control policy is based on the transmission credits and the credit limit.

20. The method of claim 17 further comprising:
enforcing simplified transaction ordering rules that allow posted and completion transaction to share same credit.

21. The method of claim 20 wherein enforcing simplified transaction ordering rules comprises:
allowing a posted request or a completion request to pass a non-posted request;
prohibiting a posted request or a completion request to pass another posted or completion request; and
prohibiting a non-posted request to pass another non-posted request.

22. The method of claim 13 further comprising:
detecting an idle state on the link bus line without using a special message to or from the device.

23. The method of claim 22 wherein detecting comprises:
setting a receive flag when a packet is received and a bus hand-off to other device occurs; and
clearing the receive flag when there is no pending transaction to be sent and there is a bus hand-off from other device.

24. The method of claim 23 wherein detecting the idle state comprises:
detecting the idle state when there is no pending transaction to be sent after a bus hand-off from the other device and the receive flag is cleared.

25. A system comprising:
a host processor;
a memory coupled to the host processor via a memory controller (MC) having a MC manageability engine (ME) partition of an ME, the memory including a plurality of double data rate synchronous dynamic random access memory device;
a chipset coupled to the host processor, the chipset having a host partition and an ME space having an input/output (I/O) ME partition of the ME, the I/O ME partition managing input/output resources which are shared between a processor interface space of the host processor and the ME space in a secure manner, the chipset comprising an interface circuit, the interface circuit comprising:
a first clock source to generate a first clock signal at a first frequency on a link bus line synchronized with first data; and
a device residing in the I/O ME partition coupled to the chipset via the link bus line, the device having a second clock source to generate a second clock signal at a second frequency synchronized with second data when the device transmits the second data; the first and second data each forming a packet being one of a posted packet, a completion packet, and a non-posted packet, the first and second frequencies being independent of each other and bounded within first and second frequency ranges, respectively;
wherein the interface circuit having a queue structure to store packets used in a credit-based flow control policy, the queue structure having a first queue to store receive posted and completion packets and a second queue to store receive non-posted packets.

26. The system of claim 25 wherein the first frequency range is from approximately 8 MHz to 66 MHz and the second frequency range is from approximately 32 MHz to 266 MHz.

27. The system of claim 25 wherein the interface circuit further comprises:
a transaction ordering logic coupled to the queue structure to enforce simplified transaction ordering rules that allow posted and completion transaction to share same credit.

28. The system of claim 27 wherein the transaction ordering logic allows a posted request or a completion request to pass a non-posted request, prohibits a posted request or a completion request to pass another posted or completion request, and prohibits a non-posted request to pass another non-posted request.

29. The system of claim 25 wherein the interface circuit further comprises:
an idle detector to detect an idle state on the link bus line without using a special message to or from the device.

* * * * *